United States Patent Office 3,152,115
Patented Oct. 6, 1964

3,152,115
NEW ARYL GLUCOSAMINIDES
Charles J. Morel, Arlesheim, Basel-Land, and Willy G. Stoll, Bottmingen, Basel-Land, Switzerland, assignors to Geigy Chemical Corporation, Ardsley, N.Y., a corporation of Delaware
No Drawing. Filed Nov. 16, 1961, Ser. No. 152,931
Claims priority, application Switzerland Nov. 17, 1960
9 Claims. (Cl. 260—210)

The present invention concerns new aryl glucosaminides and derivatives of same.

In one aspect of the invention it relates to new aryl glucosaminides as well as their salts with pharmaceutically acceptable acids. It has been found that aryl glucosaminides corresponding to the general formula

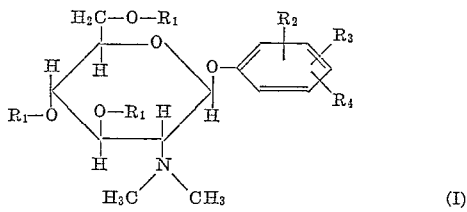

(I)

wherein all three $R_1$'s must be hydrogen or all three must be acetyl, $R_2$ is hydrogen, lower alkyl or benzyl and $R_3$ and $R_4$ independently of each other are hydrogen or lower alkyl, as well as their salts with pharmaceutically acceptable acids have useful pharmacological properties, in particular neurophysiological activity with slight toxicity. They also potentiate the action of other pharmaceuticals, in particular of anaesthetics. Furthermore, they can be used for the treatment of mental disorders. The compounds of Formula I may be administered per os or parenterally, in the form of aqueous solutions of their non-toxic salts, i.e., salts with pharmaceutically acceptable acids.

Examples of pharmaceutically acceptable acids are hydrochloric acid, hydrobromic acid, sulphuric acid, phosphoric acid, methane sulphonic acid, ethane disulphonic acid, acetic acid, citric acid, malic acid, succinic acid, fumaric acid, maleic acid, tartaric acid, benzoic acid and phthalic acid, and of these hydrochloric acid, hydrobromic acid, methane sulphonic acid and citric acid are preferred.

"Lower" in this specification means a radical with 1–4 carbon atoms.

A second aspect of the invention relates to quaternary salts of the new aryl glucosaminides. These salts have the general formula

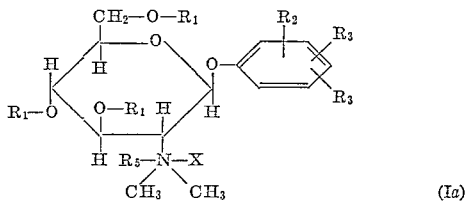

(Ia)

wherein $R_5$ is lower alkyl, X is chlorine, bromine or iodine, and $R_1$, $R_2$, $R_3$ and $R_4$ have the meanings given above. Quaternary ammonium salts which are derived from the tertiary bases defined above cause a decrease in the blood pressure.

The new compounds are produced by reacting a salt, particularly an alkali metal salt, of a phenol of the general formula

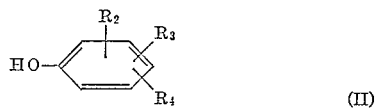

(II)

wherein $R_2$, $R_3$ and $R_4$ have the meanings given above, with α-bromo-3,4,6-triacetyl-D-glucosamine or its hydrobromide, the reaction being performed preferably in an anhydrous inert organic solvent such as, e.g., acetone, at room temperature or at a moderately raised temperature, treating the compound formed of the general formula

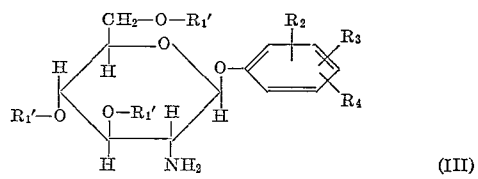

(III)

wherein each $R_1'$ represents an acetyl radical, with formaldehyde and catalytically activated hydrogen in an inert solvent and at substantially room temperature, isolating the compound formed as reaction product of the general formula

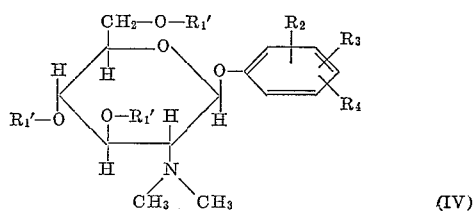

(IV)

which is embraced by general Formula I, either as such or as salt and, if desired, converting this, preferably by treatment with ammonia in an organic solvent, into the corresponding compound embraced by general Formula I in which $R_1$ is hydrogen and if desired, reacting the latter compound or the compound of the general Formula IV with a reactive ester of a low aliphatic or an araliphatic alcohol to form a quaternary ammonium salt of the general Formula Ia and, if desired, splitting off the acetyl radicals present in the quaternary ammonium salt.

The reductive methylation of the compounds of the general Formula III is performed by dissolving these compounds in a suitable organic solvent such as, e.g., ethanol, adding the calculated amount, i.e., double the molar amount or a slight excess of formaldehyde, e.g., as 37% aqueous solution, also adding the catalyst, e.g., palladium or platinum oxide on a carrier such as charcoal or barium carbonate, or Raney nickel and hydrogenating, advantageously under normal pressure and at ambient temperature until, for practical purposes, no more hydrogen is taken up. The reaction products are isolated preferably as salts, in particular, hydrochlorides, however, the free bases are generally susbtances which can be crystallised. These substances of the general Formula IV are converted into those of the general Formula I in which $R_1$ is hydrogen preferably by treatment with a saturated solution of ammonia in methanol or ethanol in the cold, or they are converted according to Zemplén's method by treatment with catalytic amounts of an alkali alcoholate or of barium methylate in a low alkanol at room temperature or at a moderately raised temperature.

The compounds of general Formula I are quaternised, e.g., with methyl iodide, methyl bromide, ethyl iodide, ethyl bromide, n-propylbromide or n-butylbromide, in particular with methyl iodide, methyl bromide, ethyl iodide or ethyl bromide in the warm in a suitable organic solvent such as acetone, butanone or dioxan. Any acetyl radicals still present in the quaternary ammonium compounds can be split off, if desired, e.g., by treatment of corresponding compounds with ion exchangers, e.g., with Dowex 1 (OH−) or Amberlite IRA 400 (OH−) in ethanol.

The compounds of the general Formula I as well as their salts and quaternary ammonium compounds can be produced by a further process by reacting a salt of a phenol of the general Formula II with α-bromo-3,4,6-triacetyl-N,N-dimethyl-D-glucosamine or its hydrobromide, the reaction being performed advantageously in an anhydrous inert organic solvent such as, e.g., acetone, at room temperature or moderately raised temperature, isolating the compound formed of the general Formula IV as such or as a salt and, if desired, further converting as described under general Formula IV.

The α-bromo-3,4,6-triacetyl-N,N - dimethyl-D-glucosamine hydrobromide necessary in this process as starting material can be obtained by reductive methylation of the 1,3,4,6-tetraacetyl glucosamine analogously to the conversion of compounds of the general Formula III into those of the general Formula IV, hydrolysis of the N,N-dimethyl derivative formed with, e.g., 0.5 to 3 N hydrochloric acid in the warm to N,N-dimethyl-D-glucosamine and treatment of the latter with acetyl bromide analogously to the process for glucosamine described by J. C. Irvine, D. McNicoll and A. Hynd, J. Chem. Soc., 1911, 250.

In the compounds of the general Formula I, $R_2$ is, for example, hydrogen, the methyl, ethyl, n-propyl, isopropyl, tert. butyl, benzyl radical whilst $R_3$ and $R_4$ can be, for example, hydrogen, methyl, ethyl or isopropyl radicals.

The following examples further illustrate the performance of the process according to the invention but are by no means the only ways of performing same. Parts are given as parts by weight and their relationship to parts by volume is as that of grammes to cubic centimetres. The temperatures are in degrees centigrade.

*Example 1*

(a) 18 parts of o-benzylphenol are dissolved in 200 parts by volume of anhydrous acetone in a stirring flask fitted with a gas inlet tube and a stopper to exclude moisture, and 1 part of sodium is added in portions while cooling and passing nitrogen through the reaction vessel. When all the sodium has reacted, 9 parts of α-bromo-3,4,6-triacetyl-D-glucosamine hydrobromide (J. Chem. Soc., 1911, 250) are added and the reaction mixture is stirred for 16 hours at ambient temperature in an atmosphere of nitrogen. After evaporating in vacuo, the residue is taken up in chloroform and water, the phases are separated, the chloroform solution is washed twice with ice-cold 1 N caustic soda lye and twice with water and dried over sodium sulphate. Twice the volume of anhydrous ether is added to the chloroform solution, ethanolic hydrochloric acid is added while cooling well until there is a weakly acid reaction to congo paper and the hydrochloride of 3,4,6-triacetyl-β-(o-benzylphenyl)-D-pyranoglucosaminide which precipitates is filtered off under suction. Recrystallised from anhydrous ethanol, the hydrochloride melts at 224–225° (on decomposition). $[\alpha]_D^{23}$: —21.5° (c.=1 in ethanol).

The base can be liberated from the hydrochloride by suspending the latter in water, adding sodium hydrogen carbonate to the suspension and extracting the free base with chloroform. Recrystallised from anhydrous isopropanol, the free base melts at 130–131°. $[\alpha]_D^{23}$: —31.3° (c.=1.01 in ethanol).

(b) 11.5 parts of 3,4,6-triacetyl-β-(o-benzylphenyl)-D-pyranoglucosaminide are dissolved in 550 parts by volume of ethanol and the solution is hydrogenated with the addition of 4.12 parts of aqueous 37% formaldehyde solution and 2.8 parts of palladium charcoal at ambient temperature and normal pressure until no more hydrogen take-up can be determined (duration 22½ hours; take up 1066 parts by volume, calculated 1093 parts by volume). The catalyst is then filtered off and the calculated amount of ethanolic hydrochloric acid is added to the filtrate. This solution is evaporated to dryness in vacuo at 30–35°. The residue is dissolved in hot anhydrous isopropanol, the solution is filtered and anhydrous ether is added until it just begins to go turbid whereupon it is left to crystallise. The hydrochloride of 3,4,6-triacetyl-β-(o-benzylphenyl) - N,N - dimethyl - D - pyranoglucosaminide is obtained which melts at 179–181° (on decomposition). $[\alpha]_D^{25}$: —4.8° (c.=1 in ethanol).

The base can be liberated from the hydrochloride by dissolving the latter in water, adding sodium hydrogen carbonate to the solution and extracting the free base with chloroform. Recrystallised from ether/pentane, the free base melts at 80–81°. $[\alpha]_D^{23}$: —21.0° (c.=1.03 in ethanol).

If this free base which melts at 80–81° is recrystallised from anhydrous isopropanol, then a modification is obtained which melts at 103–104°. The infra-red spectra of both modifications in chloroform solution are identical but when taken after mulling in Nujol, they are different, from which it can be concluded that there are two different forms of crystals.

The base obtained according to this example and its hydrochloride have, in particular, an anaesthesia-potentiating action.

*Example 2*

2 parts of the hydrochloride described in Example 1b are dissolved in 50 parts by volume of anhydrous methanol and 60 parts by volume of a saturated solution of ammonia in anhydrous methanol are added at 0°. The reaction mixture is then left to stand for 3 hours under ice cooling and for 5 hours at ambient temperature whereupon it is evaporated to dryness in vacuo. The residue is taken up in a little water, sodium hydrogen carbonate is added until the reaction is alkaline to brilliant paper and the crude product which precipitates is filtered off under suction. Recrystallised from ether/pentane, the β - (o - benzylphenyl) - N,N - dimethyl - D - pyranoglucosaminide melts at 104–105°. $[\alpha]_D^{24}$: —44.6° (c.=1.01 in ethanol). It has, in particular, anti-emetic activity.

*Example 3*

10 parts of 3,4,6-triacetyl-β-(o-benzylphenyl)-N,N-dimethyl-D-pyranoglucosaminide (see Example 1) are dissolved in 75 parts by volume of anhydrous acetone and after the addition of 6 parts by volume of methyl iodide, the whole is refluxed for 40 hours. The reaction mixture is then evaporated in vacuo at ambient temperature and the residue is recrystallised from anhydrous isopropanol. 3,4,6 - triacetyl - β - (o - benzylphenyl) - N,N - dimethyl-D - pyranoglucosaminide methoiodide is obtained which melts at 175–176°. $[\alpha]_D^{23}$: —21.2° (c.=1 in ethanol).

*Example 4*

6 parts of methoiodide obtained according to Example 3 are dissolved in 35 parts by volume of 50% ethanol and the solution is slowly passed through a column containing 100 parts by volume of Dowex 1 (OH$^-$). The column is then washed through with 50% ethanol until the eluate gives a neutral reaction. The total solution is then neutralised with 1 N-hydrochloric acid and evaporated to dryness in vacuo at ambient temperature. Recrystallised from anhydrous alcohol/anhydrous ether, the β-(o-benzylphenyl) - N,N - dimethyl - D - pyranoglucosaminide methochloride melts at 167–168°. $[\alpha]_D^{23}$: —43.6° (c.=1.01 in ethanol).

*Example 5*

The hydrochloride of 3,4,6 - triacetyl-β-(2,6-dimethylphenyl)-D-pyranoglucosaminide is obtained from 43 parts of 2,6-dimethylphenol dissolved in 500 parts by volume of anhydrous acetone, 4.6 parts of sodium and 45 parts of α-bromo-3,4,6 - triacetyl - D - glucosamine hydrobromide analogously to Example 1. The hydrochloride, after recrystallisation from 90% ethanol, melts at 230–232° (on decomposition). $[\alpha]_D^{23}$: +9.5° (c.=1 in 50% ethanol).

The base liberated analogously to Example 1, after recrystallisation from isopropanol, melts at 125–126°. $[\alpha]_D^{22}$: +5.8° (c.=1.06 in ethanol).

Example 6

32 parts of the base obtained according to Example 5 are dissolved in 1000 parts by volume of ethanol, 12.8 parts of aqueous 37.5% formaldehyde solution are added and the whole is hydrogenated, with the addition of 12 parts of palladium charcoal, as described in Example 1. The product is worked up in the same way. After recrystallisation from ethanol, the hydrochloride of 3,4,6-triacetyl - β - (2,6 - dimethylphenyl) - N,N-dimethyl-D-pyranoglucosaminide melts at 214–216° (on decomposition). $[\alpha]_D^{23}$: +14.3° (c.=0.495 in water).

The base liberated analogously to Example 1, after recrystallisation from isopropanol, melts at 113–114°. The 1% solution in ethanol is optically inactive.

Example 7

2 parts of 3,4,6-triacetyl-β-(2,6-dimethylphenyl)-N,N-dimethyl-D-pyranoglucosaminide are dissolved in 60 parts by volume of anhydrous acetone, 2 parts by volume of methyl iodide are added and the whole is refluxed for 72 hours, 2 parts by volume of methyl iodide being added after every 12 hours. The reaction mixture is evaporated to dryness at ambient temperature and the residue is recrystallised twice from anhydrous isopropanol whereupon 3,4,6 - triacetyl - β - (2,6 - dimethylphenyl) - N,N - dimethyl-D-pyranoglucosaminide methoiodide is obtained. $[\alpha]_D^{23}$: +22.8° (c.=1 in ethanol).

Example 8

5,5 parts of the methoiodide obtained according to Example 7 are dissolved in 35 parts by volume of 50% ethanol and the solution is slowly passed through a column containing 100 parts by volume of Amberlite IRA 400 (OH⁻). The column is then washed through with 50% ethanol until the eluate is neutral for all practical purposes. The whole solution is then neutralised with 1 N - hydroiodic acid and evaporated to dryness in vacuo at room temperature. Recrystallised from anhydrous alcohol/anhydrous ether, the β-(2,6-dimethylphenyl)-N,N - dimethyl-D-pyranoglucosaminide methoiodide melts at 183–184° at $[\alpha]_D^{23}$:+11.6° (c.=1.08 in ethanol).

What is claimed is:

1. A member selected from the group consisting of an aryl glucosaminide of the formula

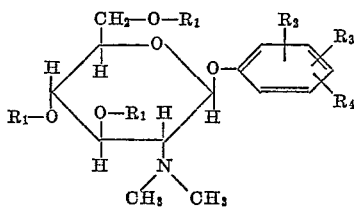

(I)

wherein each $R_1$ is the same member selected from the group consisting of hydrogen and acetyl, $R_2$ is a member selected from the group consisting of hydrogen, lower alkyl and benzyl, and $R_3$ and $R_4$ independently of each other are a member selected from the group consisting of hydrogen and lower alkyl, and the pharmaceutically acceptable acid addition salts thereof.

2. 3,4,6 - triacetyl-β-(o-benzylphenyl)-N,N-dimethyl-D-pyranoglucosaminide.

3. β - (o-benzylphenyl)-N,N-dimethyl-D-pyranoglucosaminide.

4. 3,4,6 - triacetyl-β-(2,6 - dimethylphenyl)-N,N-dimethyl-D-pyranoglucosaminide.

5. Quaternary salts of aryl glucosaminides of the formula

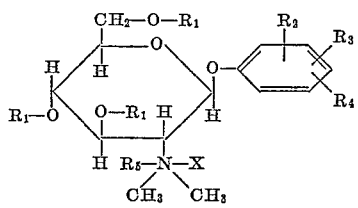

(Ia)

wherein each $R_1$ is the same member selected from the group consisting of hydrogen and acetyl, $R_2$ is a member selected from the group consisting of hydrogen, lower alkyl and benzyl, $R_3$ and $R_4$ independently of each other are a member selected from the group consisting of hydrogen and lower alkyl, $R_5$ is lower alkyl, and X is a member selected from the group consisting of chlorine, bromine and iodine.

6. 3,4,6 - triacetyl-β-(o-benzylphenyl)-N,N-dimethyl-D-pyranglucosaminide methoiodide.

7. β - (o-benzylphenyl)-N,N-dimethyl-D-pyranoglucosaminide methochloride.

8. 3,4,6 - triacetyl-β-(dimethylphenyl)-N,N-dimethyl-D-pyranoglucosaminide methoiodide.

9. β-(2,6 - dimethylphenyl)-N,N-dimethyl-D-pyranoglucosaminide methochloride.

No references cited.